Figure 1:
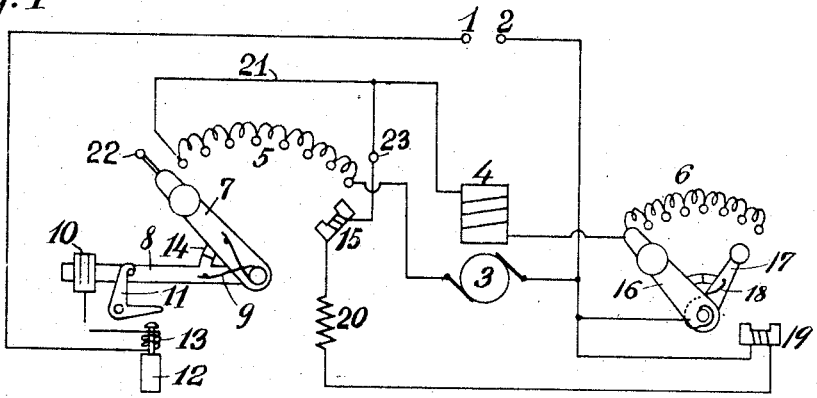

H. W. LEONARD.
ELECTRIC MOTOR CONTROLLING APPARATUS.
APPLICATION FILED MAY 11, 1909.

984,511.

Patented Feb. 14, 1911.

2 SHEETS—SHEET 1.

Witnesses
M. E. Moore
Thomas Howe

Inventor
H. Ward Leonard
By his Attorneys
Edwards, Sager & Woods

H. W. LEONARD.
ELECTRIC MOTOR CONTROLLING APPARATUS.
APPLICATION FILED MAY 11, 1909.

984,511.

Patented Feb. 14, 1911.

2 SHEETS—SHEET 2.

Witnesses
M. E. Moore
Thomas Howe

Inventor
H. Ward Leonard,
By his Attorneys
Edwards, Sager & Wooster

UNITED STATES PATENT OFFICE.

HARRY WARD LEONARD, OF BRONXVILLE, NEW YORK.

ELECTRIC-MOTOR-CONTROLLING APPARATUS.

984,511.  Specification of Letters Patent.  Patented Feb. 14, 1911.

Original application filed January 23, 1905, Serial No. 242,203. Renewed February 20, 1907, Serial No. 358,417. Divided and this application filed May 11, 1909. Serial No. 495,357.

*To all whom it may concern:*

Be it known that I, HARRY WARD LEONARD, a citizen of the United States, residing at Bronxville, in the county of Westchester and State of New York, have invented certain new and useful Improvements in Electric-Motor-Controlling Apparatus, of which the following is a full, clear, and exact specification.

This invention relates to electric motors, and particularly to the provision of means which will insure the proper operation of controlling devices therefor.

This application is a division of my pending application filed January 23, 1905, Serial No. 242,203; renewed February 20, 1907, Serial No. 358,417, granted December 13, 1910, Patent No. 978,193.

By my invention I provide controlling means for each element of the motor and the controlling means of one element are functionally related to those of the other so that they are necessarily operated in a proper manner. I therefore protect the motor and other portions of its circuit from the objectionable or injurious effects due to improperly starting up or operating a motor when the strength of its field is less than a desirable amount. I also provide suitable protective devices which will respond to protect the motor under abnormal conditions, all of which coöperate to secure freedom to the motor from any harmful effects.

My invention may be embodied in various arrangements and forms of construction, some of which are shown in the accompanying drawings, and the form illustrated in each figure comprises my invention and represents one specific embodiment thereof.

Figures 1 to 6 of the drawings are diagrammatic views illustrating preferred forms of my invention, each showing a modification different from that shown in the other views.

Similar parts are indicated by the same reference character in each of the figures.

Referring to Fig. 1, the supply terminals of a constant electromotive force circuit are indicated at 1, 2, the motor armature at 3, and the motor field at 4. A starting resistance 5 is shown connected in the armature circuit and a resistance for varying the field strength is indicated at 6. The starting rheostat is in this instance provided with two arms 7, 8 pressed toward each other by a spring 9. The arm 8 serves as a main overload switch and normally engages a fixed contact 10, being retained in position by a catch 11. The latter is adapted to be thrown by the upward movement of core 12 when an abnormal current flows through its coil 13. The coil 13 is connected in the main circuit from 1 to contact 10. The arm 7 is shown in the off position and in this position closes the switch or arm 8 as, for example, by engagement of an abutment 14. A no-voltage or low voltage magnet 15 is provided for holding the arm 7 when all starting resistance is cut out. The controlling arm 16 of the field rheostat is not spring pressed, but there is provided an arm 17 and spring 18, which spring tends to force arm 17 against the arm 16 and throw the latter to such a position that all field resistance is cut out. A retaining magnet 19 is provided for the arm 17 and its coil is connected in series with coil 15 and a resistance 20 across the line. When the current supply is interrupted, or a very low voltage occurs, the magnets 15 and 19 are deënergized, or their strength reduced, the arm 7 returning to the off position by pressure of spring 9 and the arm 17 is forced against the arm 16, returning it to such a position that all the field resistance is cut out as shown. Hence, upon starting, the field will always have its full strength, and the objectionable effects of starting under a weak field are avoided. In starting, the arm 7 is moved to the first contact of the starting resistance and the circuit through the armature and resistance 5 from the supply mains is completed. The motor field is then fully excited, current passing from 1, through the overload coil 13, arms 8 and 7, conductor 21, field 4, arm 16 to terminal 2. Current also passes independently across the line through coil 15, resistance 20, and coil 19. As arm 7 is moved, the starting resistance is cut out and when the arm reaches its final position, it will be held by the magnet 15. The arm 7 may in some cases be provided with an auxiliary contact 22 which engages the contact 23 at the final position. This will connect the field directly across the line and the magnet coils 15 and 19 will likewise be connected directly across the line. When it is desired to weaken the field of the motor, the arm 17 is moved to engage the retaining magnet 19. The field rheostat arm is then free to be moved to vary the field resistance and therefore the speed of the motor. If an abnormally large current or overload is taken by the motor, the core 12 will be raised and knock the latch 11 to release arm 8, breaking the main circuit at the contact 10. This will deenergize the magnets 15 and 19, and cause the field rheostat arm 16 to be forced to its initial position, cutting out the field resistance and insuring a full field strength upon starting. Before again starting, it is necessary to move the switch 8 to its closed position by means of arm 7, thus insuring the closing of switch 8 before the circuit is closed by the starting arm 7.

Figure 2:
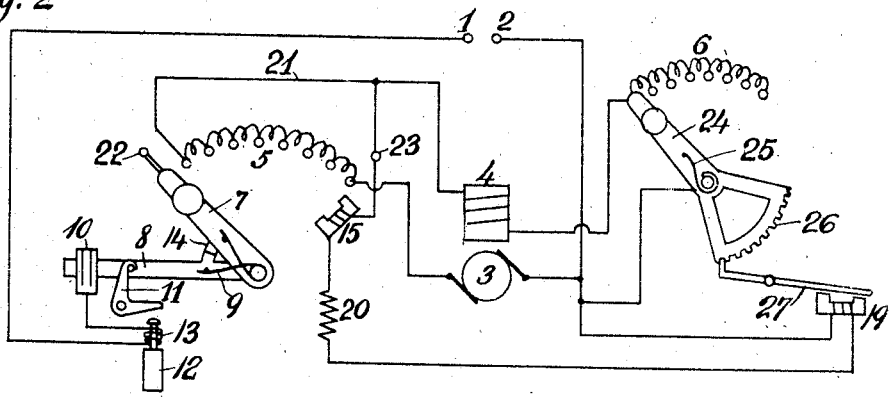

In Fig. 2 a construction is disclosed which is in general similar to that of Fig. 1. The controlling arm 24 of the field rheostat is spring pressed, however, as by spring 25. The arm has a toothed sector 26, the teeth of which are engaged by a pivoted lever 27, the action of gravity tending to keep the lever and teeth in contact. The retaining magnet 19, when energized tends to force one end of lever 27 into engagement with the teeth and with a sufficient amount of force to overcome the pressure of the spring 25, thus holding the arm in any position desired. When, however, the magnet is deënergized, the spring 25 will return the arm to the position shown, the teeth slipping by the end of lever 27. The field resistance is thus cut out and starting under full field strength is insured. After starting, the arm 24 may be operated manually, overcoming the spring pressure and the force of holding lever 27.

Figure 3:
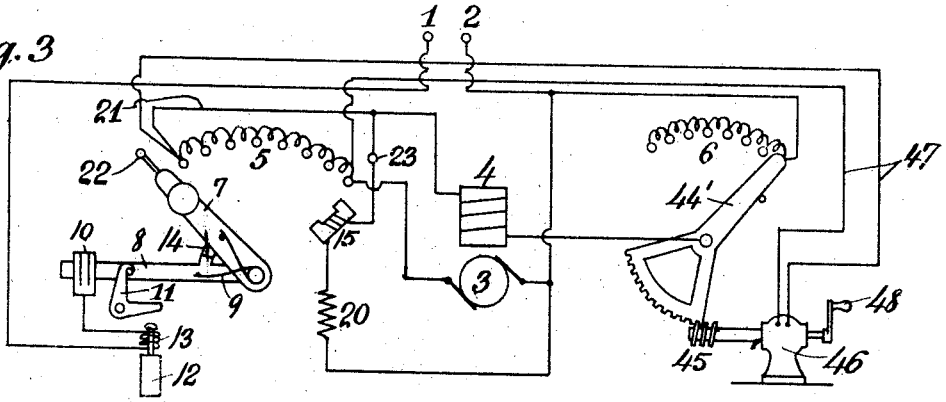

In Fig. 3 a construction is indicated in which the starting rheostat and overload and no-voltage devices are similar to those shown in Fig. 1. The controlling arm 44' of the field rheostat is, however, provided with a toothed rack engaged by a worm 45 on the shaft of a small motor 46. This motor is connected by wires 47 to the outside contacts of the armature resistance 5, or if desired to intermediate contacts thereon. The motor 46 is therefore subjected to the drop in volts which occurs on the starting resistance and when driven, turns in a direction so as to cut out any field resistance which may happen to be in circuit. When the arm 7 is moved to the first contact in starting, the motor 46 is subjected to the drop occurring between the terminals of wires 47 and the motor 46 will be driven so as to move the field rheostat arm to the position shown, giving the field its full strength. The resistance 5 will thereafter be cut out only under condition of a full field. When all of the armature resistance is cut out, the motor 46 will have no further tendency to turn.

The strength of the field 4 may afterward be varied by manually cutting in or out portions of the resistance 6, as by turning the handle 48 on the shaft of motor 46.

Figure 4:
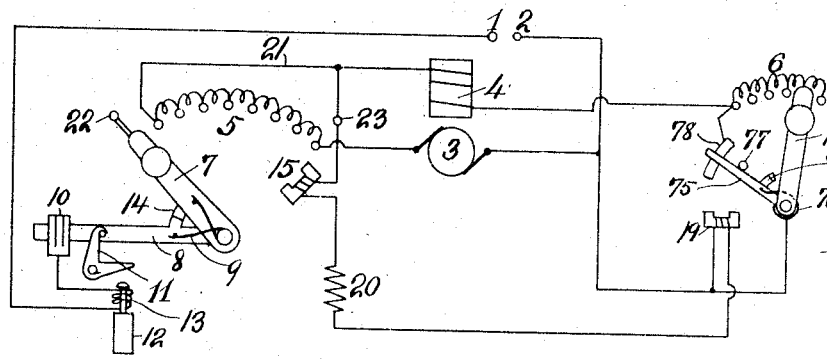

In Fig. 4 I have shown a starting rheostat and overload device of the form shown in Fig. 1. An arm 16 is freely movable over the field resistance 6 and is adapted to engage an abutment 74 on arm 75 to force the same against the pressure of spring 76 to engage the no-voltage or low voltage magnet 19. The latter is connected in series with the no-voltage magnet 15 and resistance 20 across the line as in Fig. 1. Upon the occurrence of a low voltage, the spring 76 will throw the arm 75 against a stop 77. In this position the arm 75 engages a contact 78 in electrical connection with the initial contact of the field resistance, and forms a direct path for the field current from the field coil through arm 75 to terminal 2. Any field resistance cut in by arm 16 will therefore be short-circuited by arm 75 and starting under a full field is therefore insured. After starting, the arm 16 may be moved to remove the short-circuiting arm 75 and force the same against the magnet 19, where it will be held, and arm 16 may then be moved to vary the resistance in the field circuit.

Figure 5:
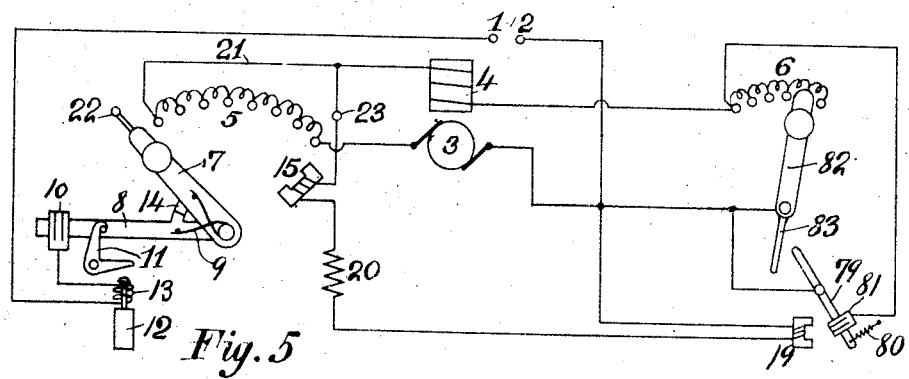

In Fig. 5 the magnet 19 will hold one end of the pivoted lever 79 against the pressure of spring 80 under running conditions. When released by the magnet, the lever will engage a contact 81 which is in electrical connection with the initial contact of the field resistance. The lever is in electrical connection with the terminal 2. The engagement of the lever with contact 81 will therefore short-circuit the field resistance, there being a direct connection from the field coil to contact 81, through lever 79 to terminal 2. Starting will therefore necessarily occur under full field strength. After starting, the arm 82 must be moved to the initial contact and by means of the extension 83, throw the lever 79 out of engagement with contact 81 and into position to be retained by magnet 19. This will remove the short-circuit of the resistance 6 and the field strength may then be changed as desired.

Figure 6:
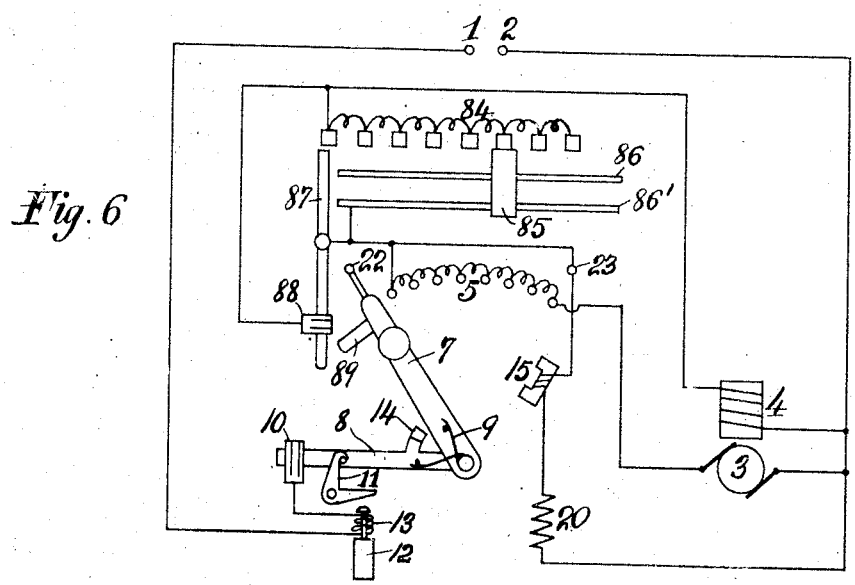

In Fig. 6 I show a form of starting rheostat and overload device previously described. The field resistance is indicated at 84 and the amount of this resistance in circuit with the field is varied by moving the element or rider 85 along the guides 86, 86'. The guide 86' is in electrical connection with the element 85 and with the initial contact of the starting resistance and contact 23. A pivoted lever 87 is in electrical connection with the same contacts as well as conductor 86', and in one position is adapted to engage a fixed contact 88, which contact is connected to a point between the field resistance and field coil. Arm 7 is provided with an abutment or projection 89, and when the arm 7 returns under pressure 9 to off position it will engage the lever 87 and force it to engage contact 88. Hence, upon starting, any field resistance in the circuit will be short-circuited by the path through lever 87 and contact 88 to the field coil, giving the field its full strength. In order to remove the short-circuit after starting, it will be necessary to move the element 85 to cut out all field resistance and to engage lever 87 so as to cause it to break connection with contact 88. The element 85 may then be moved to cut in the field resistance and vary the field strength as desired.

Many other modifications of my invention may be developed and various changes in the connections may be made and accomplish substantially the same results.

It will be understood that instead of using a starting rheostat contact switch, I may, in some cases, omit the starting resistance and use a plain switch. I may sometimes use a controlling armature resistance for varying the speed, in which case the arm of the rheostat would be freely movable and remain in any position placed.

Although I have indicated resistances in the circuits of some of the coils which act automatically to cause a circuit to be opened, it will be understood that in some cases they may not be necessary and may be made adjustable if desired to change the volts dropped in them.

As my invention is susceptible of a variety of embodiments, all within the scope and spirit thereof I do not wish or intend to limit the same to the specific constructions herein described, or otherwise than as expressed in the following claims.

Having thus described my invention, I declare that what I claim as new and desire to secure by Letters Patent, is:—

1. Means for controlling an electric motor circuit comprising armature control mechanism, means for retaining the same in short-circuit position, field control mechanism, means normally tending to return the same to full field position, and means controlled by the armature control mechanism for rendering the said return means inoperative.

2. Means for controlling an electric motor circuit comprising armature control mechanism biased to the starting position, field control mechanism, means normally tending to return said latter mechanism to full field position and means controlled by the armature controlling mechanism for rendering the said returning means inoperative.

3. Means for controlling an electric motor circuit comprising armature control mechanism, field control mechanism, means normally tending to return said latter mechanism to full field position and a no-voltage magnet controlled by the armature controlled mechanism for controlling the returning means.

4. Means for controlling an electric motor circuit comprising armature control mechanism biased to the starting position, field control mechanism, means normally tending to return said latter mechanism to full field position and a no-voltage magnet controlled by the movement of the armature control mechanism from running position for rendering the said returning mechanism inoperative.

5. Means for controlling an electric motor circuit comprising armature control mechanism biased to the starting position, a no-voltage magnet therefor, field control mechanism, means normally tending to return said latter mechanism to full field position, and a no-voltage magnet controlled by the movement of the armature control mechanism from running position for rendering the said returning mechanism inoperative.

6. Means for controlling an electric motor circuit comprising armature control mechanism, field control mechanism, means normally tending to return said latter mechanism to full field position and electrically controlled means responsive to movement of the armature control mechanism from running position for rendering the said returning means inoperative.

7. Means for controlling an electric motor circuit comprising armature control mechanism, field control mechanism, means normally tending to return said latter mechanism to full field position and means responsive to movement of the armature control mechanism for controlling the returning means.

8. In combination with a dynamo electric machine, armature controlling means, and field controlling means, said field controlling means comprising means for manually and automatically controlling the field circuit and said field controlling means comprising two mechanically related independently movable elements, one of which is an element of the field rheostat, and said field controlling means being electrically controlled by said armature controlling means.

9. In combination with an electric motor, armature controlling means therefor, and field controlling means therefor, said field controlling means comprising two mechanically related independently movable elements, and said field controlling means being electrically controlled by said armature controlling means.

10. The combination with an electric motor, of an armature resistance device therefor having a movable element, field controlling means electrically controlled by said movable element, said field controlling means comprising a normally restrained automatically movable element responsive to low voltage.

11. The combination with an electric motor, of controlling means therefor adapted to independently vary the armature and field energies of the motor, said means comprising three functionally related automatically movable contact making elements, two of said three elements being mechanically related and one of said three elements being a field controlling element, and means comprising a low voltage winding controlling said latter element, the circuit of said low voltage winding being controlled by each of the other two elements.

12. An electric motor, and motor controlling means therefor adapted to independently vary the energy in the armature and field windings of the motor, said means comprising three automatically movable elements, two of which are mechanically related and independently movable and adapted to control the circuit of the field winding of the motor and the third of which is adapted to control the motor armature circuit and also to control the automatic movement of the said two mechanically related elements.

13. The combination of an electric motor, and field controlling means therefor comprising two mechanically related movable elements, one adapted to be normally restrained and to be automatically moved upon occurrence of low voltage, a low voltage electro-responsive device therefor, means whereby said element is automatically moved when released, the other of said movable elements being the movable element of a field rheostatic device, and functionally related automatically movable means adapted to control said field controlling means.

14. An electric motor, and controlling means therefor comprising a low voltage electro-responsive restraining means, a movable element adapted to be normally restrained thereby and to be automatically moved when released, a movable resistance varying element adapted to control without opening the field circuit and to be moved by the aforesaid element when it is released, and an automatically movable element adapted to control the circuit of the motor armature and the circuit of said restraining means.

15. An electric motor, an armature controlling automatically movable element, restraining means therefor responsive to low voltage, a field-controlling automatically movable element, restraining means therefor responsive to low voltage, the circuit of the last mentioned restraining means being controlled by the said armature controlling movable element.

16. An electric motor, and means for controlling said motor, comprising two low voltage electro-responsive devices, the windings of which are connected in series with each other, one of said devices controlling the field circuit of the motor.

17. An electric motor, and means for controlling said motor, comprising two functionally related low voltage windings, one of which is adapted to control the field current of an electric motor and is controlled through the agency of the other of said windings.

In testimony whereof I affix my signature, in presence of two witnesses.

H. WARD LEONARD.

Witnesses:
C. J. CORNELL,
GEO. J. SCHELZ, Jr.